United States Patent [19]

Feigenbaum et al.

[11] Patent Number: 5,367,671
[45] Date of Patent: Nov. 22, 1994

[54] SYSTEM FOR ACCESSING EXTENDED OBJECT ATTRIBUTE (EA) DATA THROUGH FILE NAME OR EA HANDLE LINKAGES IN PATH TABLES

[75] Inventors: Barry A. Feigenbaum, Boca Raton; Felix Miro, Cooper City, both of Fla.

[73] Assignee: International Business Machines Corp., Armonk, N.Y.

[21] Appl. No.: 587,813

[22] Filed: Sep. 25, 1990

[51] Int. Cl.⁵ .............................................. G06F 12/02
[52] U.S. Cl. ..................................... 395/600; 395/700; 364/DIG. 1; 364/280; 364/282.3; 364/283.1
[58] Field of Search .......................... 395/600, 700, 650

[56] References Cited

U.S. PATENT DOCUMENTS 5,075,848  12/1991  Lai et al. .............................. 395/425
5,206,951  4/1993   Khoyi et al. .......................... 395/650

OTHER PUBLICATIONS

Duncan R., Design Goals and Implementation of the New High Performance File System, Microsoft Systems Journal, Sep. 1989 p. 1(13).
Duncan R, Using long filenames and extended attributes pt. 1 PC Magazine Apr. 24, 1990 p. 317(5).
Duncan R, Using long filenames and extended attributes pt. 2 PC Magazine May 15, 1990 p. 305(5).
Duncan, R. The MS-DOS Encyclopedia, Microsoft Press 1988, pp. 97-103, 150-154, 247-279.
IBM, OS/Z Programming Tools and Information v. 1.2 Control Program Programming Reference, (1989).
IBM OS/Z Programming Tools and Information v. 1.2 Programming Guide (1989).

*Primary Examiner*—Thomas C. Lee
*Assistant Examiner*—Peter Y. Wang
*Attorney, Agent, or Firm*—Bruce D. Jobse; Robert Lieber; Jose Cortina

[57] ABSTRACT

An adaptation of a computer operating system manages storage of EA (extended attribute) data in association with object names, the latter representing paths in direct access storage devices (e.g. directories and subdirectories), and data files stored in such paths. EA data stored in association with a data file name can be accessed either jointly with or separate from the respective data file. EA data comprises one or more variable length sets of bytes stored in disk drive sectors assigned by the operating system. The location of each set is determinable by means of an EA handle that is stored in a path table containing the respective object name. Function calls from application programs to the operating system use either a file name or EA handle to access EA data. Function calls specifying only an EA handle allow EA information to be stored, modified or read without specific association to or linkage with file data. Function calls specifying a file name allow EA information to be stored, modified or read either separately from or jointly with associated file data ("jointly with" meaning for instance that a call to copy or delete a named file could be used to effect copying or deletion of both file data and associated EA data).

10 Claims, 11 Drawing Sheets

SYSTEM FOR ACCESSING EXTENDED OBJECT ATTRIBUTE (EA) DATA THROUGH FILE NAME OR EA HANDLE LINKAGES IN PATH TABLES

FIELD OF THE INVENTION

This invention relates to data processing systems, and particularly to the storage and management of extended attributes relative to information objects stored in such systems.

DEFINITION OF KEY TERMS

Information object (or object) is used here as a term generically characterizing data files, programs, and other items of information which are storable on disk as discretely accessible file entities. Hereafter, the terms "object" and "file" will be used interchangeably.

Object attribute (or just "attribute") is used presently as a term associated with a standard set of file characteristics maintained by an operating system. For example, the DOS and OS/2[1] operating systems maintain a standard attribute set per file consisting of: the file name, the date and time of last access to the file, the date and time of last revision of the file (or of creation, if the file was just created), accessibility of the file (hidden, not hidden), changeability of the file (read only, not read only), and information for the position in storage of the file data.

[1] OS/2 is a trademark of the International Business Machines Corporation.

Extended object attribute (or simply "extended attribute" or "EA") is used as a term generically characteristic of attributes other than those in the standard set.

Request and Function Call are used interchangeably to characterize information applied to an operating system for causing the latter to direct performance of certain functions relative to a data processing system.

BACKGROUND OF THE INVENTION

In computer systems, files generally are stored in a direct access storage subsystem (e.g. containing one or more disk storage devices, of either fixed or removable form), in association with a standard set of attributes (see definition of "attribute" above) describing certain characteristics of the file and its location in storage. Files and associated standard attributes are created by and revisable by application programs. Storage of files and their standard attribute sets is generally managed by the operating system in a linked manner, so that the files and their standard attributes are accessible to the operating system and other applications (applications different from the one which created the file) as if they were a single entity, even though their locations in storage may be different. This type of coordinated handling of files and attributes is referred to hereafter as "conjoint" handling.

In addition to standard attributes, an application program may create or revise extended attributes or EA's which the application associates with the file data. Hitherto, EA's have been so formed by the creating applications that they are effectively inaccessible to the operating system and other applications. More specifically, such EA's have been formed either as discrete files, which are effectively separate from the other file data created or revised by the application and associable with the latter data only by the creating application, or they have been combined with the other file data in a form such that they are effectively distinguishable only to the application which created them. Thus, although storage of all data is managed by the operating system, EA's have remained effectively inaccessible to the operating system and applications other than the creating application.

Thus, for example, when a file has been copied to another medium or directory, by invocation of a suitable command to a prior art operating system, associated EA's either have not been copied at all or they have been transferred with the file data in an indistinguishable form. In either circumstance, EA's associated with copied file data have not been useful to the operating system or another application. This can be a disadvantage to developers of applications inasmuch as it is often desirable to be able to adapt applications to be able to use file data created by other applications, and without access to extended attribute information, such adaptation would be ineffective.

Furthermore, even if access to such EA's could be obtained by other applications (for instance, via linking information placed in the base file by the creating application), it could be unwieldy to rely on such for linkage because of the diversity of language and identifying techniques used by different applications developers. Thus, the developer of an application seeking to link to a given base file would have to know the technique used by the creating application for identifying the associated EA's, and of course that technique could differ among applications made by different companies and/or individuals. Furthermore such "indirect access" to EA's would add additional processing burdens on both the originating and linking applications, as well as the operating system, when compared to the techniques associated with the present invention.

The foregoing "prior art" handling of EA's is also discussed at length in section 3 of the Detailed Description given hereafter.

It is believed that prior to recent introduction of OS/2 Version 1.2, attributes managed by operating systems have been confined to a small standard set such as that described above: i.e. with fixed context of characters and fixed character length location relative to associated file directory entries (generally, serving to conserve storage space). Thus, for example, existing versions of DOS and versions of OS/2 released prior to version 1.2 of that program have been adapted to manage only the standard set of attributes described above. Consequently, these earlier operating systems have not been able to provide conjoint access to EA's, although considering the above analysis it may now be appreciated that such conjoint access could be highly useful.

OBJECTS OF THE INVENTION

Accordingly, an object of the present invention is to provide a method and means for adapting operating systems to conjointly manage storage of extended attribute (EA) data sets and associated base file data structures as if the EA's and base data were in a single file. A related object is to adapt operating systems for conjoint handling of base file data structures and associated EA data in a manner such that, in response to an application request designating a single file name, the operating system will be able to automatically access plural separate storage spaces allocated to a data file structure and one or more EA's and operate to process data relative to any or all of those spaces either separately or jointly.

Thus, the operating system could be adapted to act in response to some requests to modify or access EA information, in one or more spaces associated with a file name, and in response to other requests to modify or access base file data in a space associated with the same name, and in response to yet other requests to modify or access all base file data and EA information associated with that name. An example of the last request action would be that in response to a request to copy or erase data associated with a designated file name, the operating system would be able to automatically copy or delete all base data and EA data stored (separately) relative to that name.

Another object is to provide an architectural extension for adapting operating systems to create and manage EA's which are virtually unlimited in form, length and information context relative to a file name associated therewith.

In general, to be useful for conjoint handling as presently contemplated, stored EA's must be significantly less constrained in length, context and location relative to other file data than the standard attribute set associated with that other data and any name used to describe that other data. However, it is recognized presently that such EA must have some identifying information which can associate it unambiguously to the other file data (hereafter also termed the "base file"), so that EA's created by one application program are not subject to conflicting or erroneous usage when accessed by another application programs. Otherwise, it is possible, for instance, that files created by different word processors would have identical appearing EA's having different meanings relative to respective base (text) files, and that such files when retrieved by word processors (or other programs) different from the creating application could be unusable or less than fully useful due to such uncertain meanings.

Accordingly another object of the present invention is to provide means for adapting applications and operating systems to be able to provide conjoint handling of EA's of varied length, context and locatability in storage. A related object is to provide a means for uniquely distinguishing EA's created by different applications so as to ensure unambiguous handling of such EA's.

SUMMARY OF THE INVENTION

In accordance with the present invention, an operating system is adapted to jointly manage storage and retrieval of named data file objects and EA (extended attributes) information associated with the objects. Specific function calls allow applications to have the operating system process object files and EA's either jointly or separately.

Function call DosOpen2 causes the operating system to open a named file and may be used to store EA information in association with the respective file name.

Function call DosMkDir2 causes the operating system to create a named directory or subdirectory and may be used to store EA information in association with the respective directory/subdirectory name.

Function call DosSetFileInfo causes the operating system to store EA information and an EA handle/pointer associating the location of that information to the name of a previously opened file.

Function call DosQFileInfo is used for reading EA information associated with the name of an open file.

Function Call DosSetPathInfo is used for storing EA information in association with the name of a file (closed or open) or directory.

Function Call DosQPathInfo is used for reading EA information associated with the name of a file (closed or open) or directory.

Function Call DosEnumAttribute is used for obtaining a list of EA's associated with a named file (closed or open) or directory.

Other (old) function calls cause the operating system to manipulate file or directory objects and associated EA's jointly; e.g. to copy or delete a named file or directory object and associated EA (or EA's) as a virtually linked data set.

The foregoing and other objects, features and other aspects of the present invention will be more fully understood and appreciated by considering the following detailed description and claims.

DETAILED DESCRIPTION

1. System Environment

Figure 1:
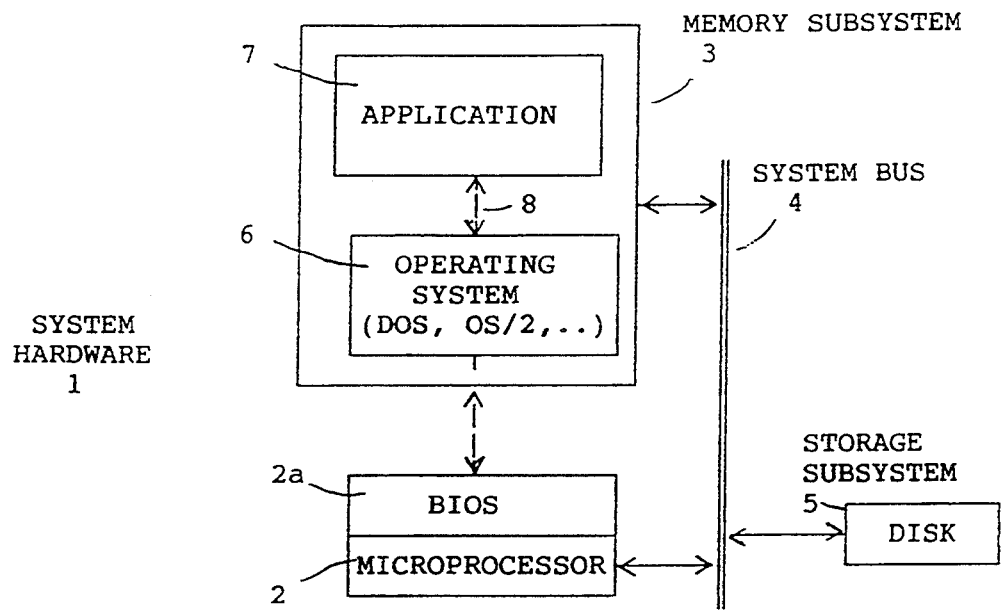
FIG. 1 schematically illustrates a typical system environment in which the present invention can be advantageously used.

Referring to FIG. 1, a typical system in which the present invention can be used advantageously is indicated generally at 1. Hardware of such a system typically comprises a microprocessor or processor 2, a memory subsystem 3 (typically, comprising direct memory access controls not shown, and random access memory, the latter predominantly volatile in today's technology environment but possibly including some non-volatile portion such as CMOS memory for storing key system configuration parameters), a bus 4 and a disk storage subsystem 5 (typically comprising a controller not-shown and one or more disk drives). Associated with microprocessor 2 is Basic Input Output System (BIOS) "firmware" 2a of well known form, which may be stored in a read only memory (ROM) portion of the memory address space associated with subsystem 3. In a manner well-known in the art, bus 4 links elements 1–3, and 5 for exchange of information signals. Not-shown are user input devices typical of such systems (keyboard, mouse, etc.) and other system elements not considered relevant to understanding the present invention.

At system start-up, an operating system program 6 (e.g. DOS or OS/2), is loaded into memory subsystem 3 for managing allocation of storage space in subsystem 5 to files created by the operating system and other programs, and for managing access to such files after they are stored in subsystem 5. Thereafter, one or more applications 7 are loaded into memory 3 for performing various tasks (word processing, spreadsheet, etc.) and for cooperating with the operating system and the BIOS firmware to store and access data files (in general, information objects) created, revised or otherwise used during task performance. This cooperation is suggested schematically by broken line 8, although it is understood that the signals which constitute the instructions and data of the operating system and applications are handled only between microprocessor 2 and memory 3 via bus 4.

2. Prior Art Management of Storage Allocation For and Access To Base Files

The "prior art" process by which existing versions of the DOS operating system manage allocation of storage space for files not having conjointly linked EA's is described extensively in chapters 9 and 10 of the book entitled "*Developing Applications Using DOS*", authored by K. W. Christopher Jr., B. A. Feigenbaum, and S. O. Saliga, and published this year by John Wiley & Sons, Inc. In order to provide a basis for explaining the management of storage for files having conjointly linked EA's, in accordance with a preferred implementation embodiment of the present invention, the prior management process for base files and standard attributes is explained briefly below. It is understood however that this process is well known and more fully described in published literature, including the above-referenced book by Christopher Jr. et al.

When a file is created, the operating system creates an associated listing in a directory tree structure described below which is maintained in storage. The listing contains the file name, one or more standard attributes, and certain other information explained below. The space allotted for each listing is fixed in accordance with standard DOS practice (i.e. 32 bytes in length). The standard attributes define certain characteristics of the file, including: dates and times of its creation or revision (whichever occurred last), dates and times of last access to the file, accessibility of the file (hidden, not hidden), changeability of the file (read only, not read only), and information for locating the (base) file data in storage. If a newly created file contains data to be stored, the application issues a request to the operating system identifying the file name and the location in system memory containing the source data to be transferred to storage. The operating system allocates space for storing that data in a manner described below, and invokes an (output) operation to store the data in that space.

When access is required to an existing file in storage, one or more requests is/are issued to the operating system indicating the name of the file and the path to its directory listing (e.g. C:WORKFILENAME, where C is a root directory, WORK represents a subdirectory, and FILENAME is the name of the file). If data is to be read from or written to the file the request designating that function indicates the destination or source in system memory to or from which the data is to be transferred. If file data is to be read, the operating system locates the data via the associated directory listing, and invokes an input operation to read that data to system memory. If file data is to be written, and if the space currently allocated to the file is insufficient to receive it, the operating system enlarges the space in a manner described below and invokes operations to store the data.

Figure 2:
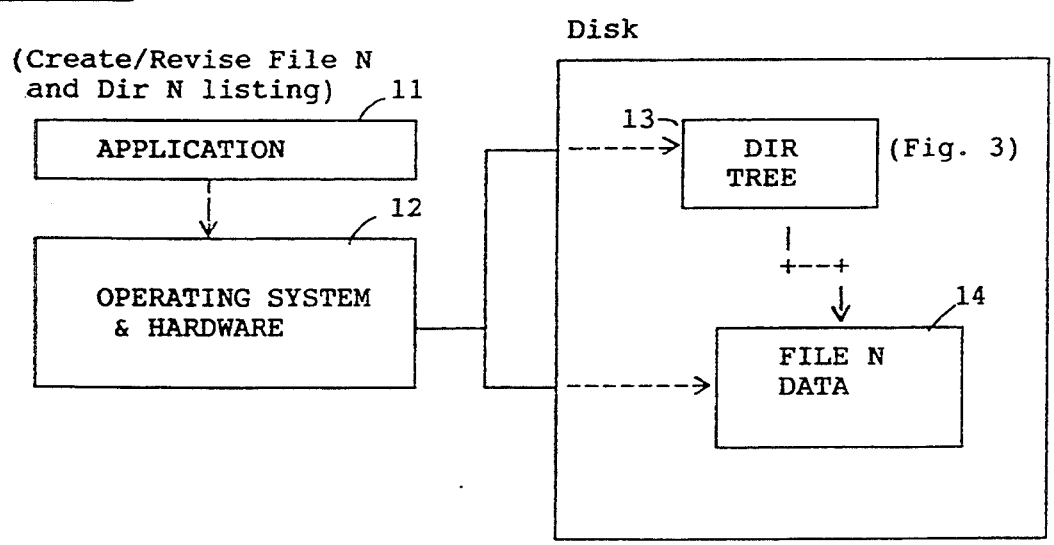
FIG. 2 schematically illustrates prior art conjoint handling of base files and standard attributes in the environment of FIG. 1.
Figure 3:
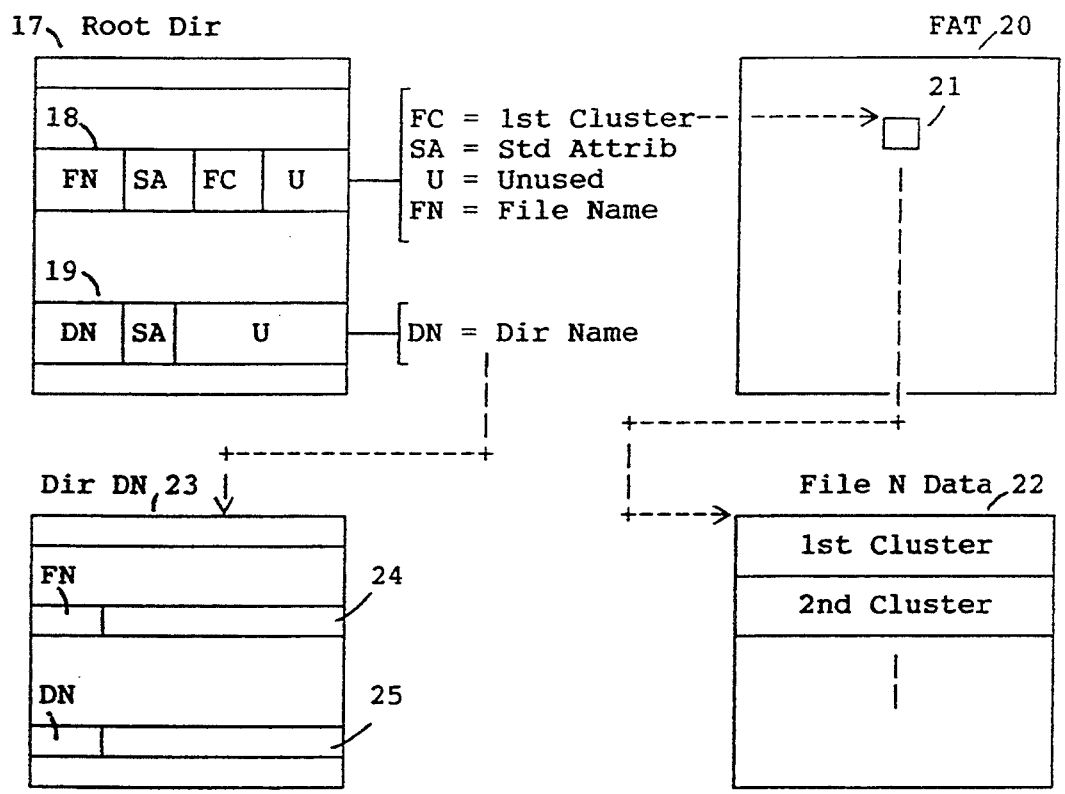
FIG. 3 schematically illustrates a prior art directory tree structure and FAT table for locating data files stored on a disk.

FIGS. 2 and 3 provide a simplistic schematic illustration of the foregoing process. As shown in FIG. 2, an application (or operating system utility) 11, seeking to create a file would provide a request to the operating system identifying the file name (name "N" in the illustration) and directory path, and the operating system 12 acts to access a directory tree structure 13 associated with the path and store an appropriate directory listing for the named file in that structure. Similarly, an application seeking to read or write data from or to an existing file, would provide a request to the operating system identifying the file name, the operation required, the destination or source in system memory of the buffer to or from which data is to be transferred and the length of that buffer. The operating system then directs execution of operations needed to carry out the transfer.

If data is to be written to a file, and space currently allocated to that file for data storage is insufficient to receive the specified length of data, operating system 12 acts to allocate additional space as needed and initiates the required (output) operation to transfer the data from system memory to storage. If no space is currently allocated to the file for data storage, the operating system acts to allocate the needed space (in a manner described below) and to modify the directory listing to include a pointer for locating that space. In the operation to store data to the file, the location designated by the pointer is passed to the subsystem controls for locating the space in which the data is to be stored.

If data is to be read from an existing file, the operating system acts to retrieve the pointer and initiates an input operation to transfer the data from the space designated by the pointer to a designated buffer in system memory. In such operation, the location designated by the pointer is passed to the subsystem controller for locating the space from which data is to be read.

Each hard file partition and floppy disk in the storage subsystem has an associated directory tree structure such as 13, which is stored in the respective partition or floppy disk, and is accessed by the operating system when needed. If a copy of the directory tree is not cached in system memory when it is needed, the operating system directs operations relative to the storage subsystem to fetch the required tree. Organization of the tree structure and related file locating elements is suggested in FIG. 3.

The tree starts with a root directory 17, in which names of files and subdirectories may be listed. When the root directory is not empty, it contains one or more file listings and/or one or more subdirectory listings. Typical file and subdirectory listings are suggested at 18 and 19, respectively. Elements of such listings are indicated by initials shown in the drawing within the list row and explained to the right of row. Each file listing contains a file name (FN), standard attributes of the file (SA), a "first cluster" pointer (FC) explained below, and several unused or reserved spaces (U). Each directory listing such as 19 contains a directory name (DN), standard attributes (SA) and unused or reserved positions (U).

If the file contains data, pointer FC serves to locate a cluster (explained below) which either contains all of the data or is an initial cluster in a series of chained clusters containing the data. Each pointer (with a value other than 0) designates a specific location within a file allocation table (FAT) 20 which is also stored on the disk. Pointers having 0 values are associated with empty files, and do not designate a FAT location. Each FAT location contains several bytes, and is associated in a one-to-one mapping with a single cluster on the respective disk or partition. A cluster represents the smallest unit of storage space which the operating system can allocate, and comprises a continuous portion of a disk or diskette. The size of a cluster varies for different media, but in general it is a multiple of 512 bytes.

A value stored in each FAT location indicates if the respective cluster is free or in use (contains data of a non-empty file), and relative to clusters in use indicates further any chaining relation of that cluster relative to other clusters. As mentioned above, the space allocated to data of a file, if larger than a cluster, consists of two or more chained clusters. Relative to each such chain of clusters, the first cluster in the chain is designated by the FC pointer in the directory listing for the associated file name. In the FAT table, the location corresponding to each cluster in a chain allocated to a given file, other than the last cluster in that chain, contains a value (written by the operating system) designating the FAT location corresponding to the next cluster in that chain. The last cluster in the chain contains a value designating it to be the last cluster in the chain.

Thus, if the file listed at 18 (with file name FN=N in this example) contains data, its first cluster pointer FC points to a FAT location 21 which maps to a cluster 22 containing all or part of the file data. If the data of file N occupies more than one cluster, the value stored at 21 will contain a chaining indication to a 2nd FAT location corresponding to a cluster containing additional data of file N. If this cluster is the last one allocated to file N data, the value at the 2nd FAT location marks it as associated with a last cluster. Otherwise, the value at the 2nd FAT location points to third FAT location associated with a third cluster in the File N chain, and so forth. Although the 1st and 2nd clusters in the File N chain are shown next to each other in FIG. 3, it should be understood that in general chained clusters can have arbitrary locations relative to each other physically. However, they may be viewed as logically contiguous by virtue of their chained relationship.

Each directory listing such as 19, in root directory list 17, contains a directory name DN associated with a subdirectory such as 23 branching immediately from the root directory. Subdirectory 23 is a table like the root directory, and it may contain further listings of files and subdirectories as suggested respectively at 24 and 25. Each directory listing such as 19 or 25 may also contain a set of standard attributes; describing date and time of its creation, etc.

With this background, it should now be understood that when a file or subdirectory is created the operating system is prompted to create a corresponding directory list entry, and if a file so created includes data the operating system is prompted to allocate one or more previously free clusters and to oversee storage of the data in those clusters. It is understood that such allocation involves revision of FAT information at coordinates mapped to the allocated clusters so that these clusters are marked as no longer free and are linked in a chain. It should be understood also that when an existing file is to be revised, replaced, or deleted, the operating system is prompted to appropriately modify the corresponding directory listing and FAT information (in respect to deletion, the listing is deleted and the FAT coordinates of the allocated clusters are marked as free). Similarly, a subdirectory having no file listings may be deleted and in that case its listing in the next higher directory would be removed.

Of course, the operating system does not perform all of the above operations by itself. As access is required to directory tree and FAT information on disk, the operating system invokes input/output operations designating the information location, via interruption calls placed to the BIOS firmware, and the latter, acting through and with the system microprocessor, causes signals to be exchanged between the microprocessor and the controls of the disk storage subsystem, for actually transferring required information. Similar processes are required to access storage spaces allocated for storage of file data when such data is to be written or read.

3. Prior Art Handling Of Extended Attributes (EA's)

Figure 4:
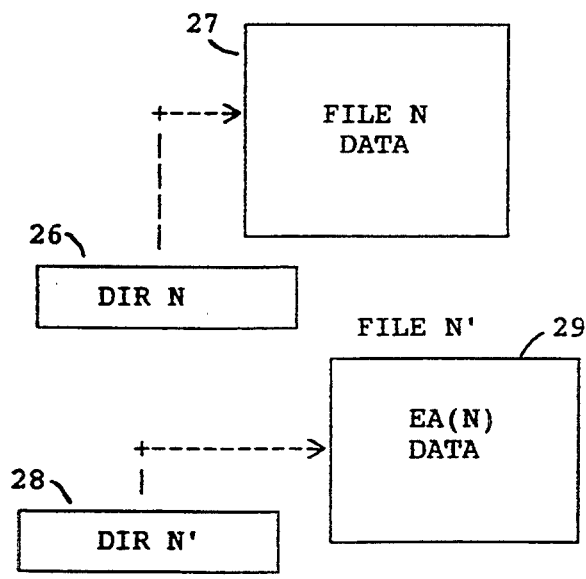
FIG. 4 schematically illustrates prior art disjoint handling of base files and EA's in the environment of FIG. 1, wherein EA's are useful only to their creating applications.
Figure 5:
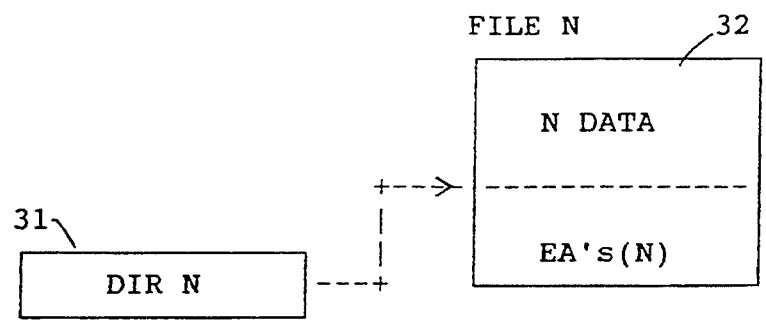
FIG. 5 schematically illustrates prior art "co-mingling" of EA's and base file data, in the environment of FIG. 1, wherein EA's are indistinguishable from base file data to the operating system and applications other than the one which created the file.

Our present understanding of prior art handling of extended attributes relative to storage, is indicated conceptually in FIGS. 4 and 5. FIG. 4 illustrates storage handling of EA's as "logically disjoint" files; i.e. files discretely separate from, and effectively disassociated from respective base files, as viewed by the operating system and applications other than that which created the base file. FIG. 5 illustrates handling of EA information together with the base file data as logically one file without any clear linkage or delineation to enable the operating system and any application other than that which created the EA information to use the EA information intelligibly relative to the base data.

FIG. 4 shows prior art handling of base file data and EA information, under management by application programs, as disjoint files which are presented without association to and dealt with as such by the operating system. Base file data is presented to the operating system as a file with name N, and EA data is presented as separate file named N' (and N'', N''' etc if more than one EA file is used). Thus, one directory listing 26 is made for file N and that file is stored in space 27 locatable through that listing, and another unrelated listing is created for file N' at 28 and file N' data (i.e. the EA data) is stored in space 29 which is unassociated with file N or its listing 26. Accordingly, the files N and N' can only be handled associatively by their creating application, and they have no conjoint usage or meaning to the operating system and other applications.

Another prior art arrangement for EA storage, a variant of the arrangement shown in FIG. 4, is shown in FIG. 5. Here, the EA's are passed to the operating system as part of file N, having a single directory listing at 31, and stored with the file base data at 32 so that any association or usage relationship between the EA's and base data is not indicated to the operating system or to applications other than the one creating the file.

4. Present Conjoint Handling Of EA's (Conceptual)

Figure 6:
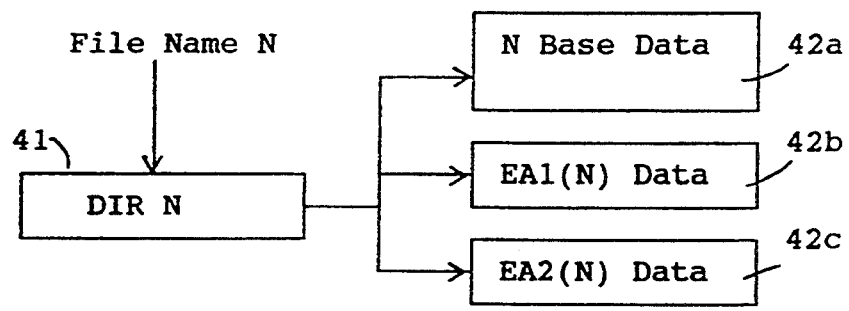
FIG. 6 illustrates in a simplified form, and on a conceptual level not limited to any specific implementation, how an operating system may be adapted to manage allocation and usage of space in storage conjointly, for an associated base data file and EA's, in accordance with the present invention.

FIG. 6 illustrates in conceptual form (without implementation-specific connotation or restrictions) how an operating system can allocate and conjointly manage access to storage for a file named "N" associable with separately stored data representing base file data and EA's associated with that file name. Here, although a single directory listing is made at 41, the files are separately stored as indicated at 42a, 42b and 42c linkable to the entry 41. Thus, the base data and EA's can be accessed either individually or jointly by the operating system, and they can be made available in that fashion to applications different from the one which created them. The two spaces 42b and 42c shown for EA's are intended to indicate that any number of EA's (including 0) can be handled in this manner.

A unique aspect of this configuration is that the spaces 42a 42c can be accessed jointly via their association with the common directory listing 41. Another unique aspect is that neither of the spaces 42b and 42c is chained to space 42a, so that spaces 42b and 42c can be accessed separately for storage and retrieval of EA's. Another unique aspect is that EA data stored in spaces 42b and 42c is distinguishable as constituting two separate sets of data (by virtue of the format of the data or other distinguishing aspect) so that the spaces 42b and 42c can be accessed as separate entities. Yet another unique aspect is that spaces 42b and 42c can have arbitrary size and the information placed in these spaces can have arbitrary context. Since spaces 42a–42c can be accessed jointly, the base data and EA data associated with respective file name N can, for instance, be copied, deleted or transferred to any application as a single unit when such copying, deletion or transfer is appropriate.

5. Present Conjoint Handling Of EA's—Preferred Embodiment

An implementation of the process for conjoint handling of base files and EA's, in accordance with a preferred embodiment of the invention, is described next with reference to FIGS. 7-15. This implementation is used in version 1.2 of the OS/2 operating system. Details of this implementation can be found in the IBM Operating System/2 TM Programming Tools And Information Version 1.2 Control Program Programming Reference First Edition (September 1989)[2], and in chapter 33 of "IBM Operating System/2 Version 1.2 Programming Guide" First Edition (September, 1989), available separately to users of this operating system.

Figure 7:
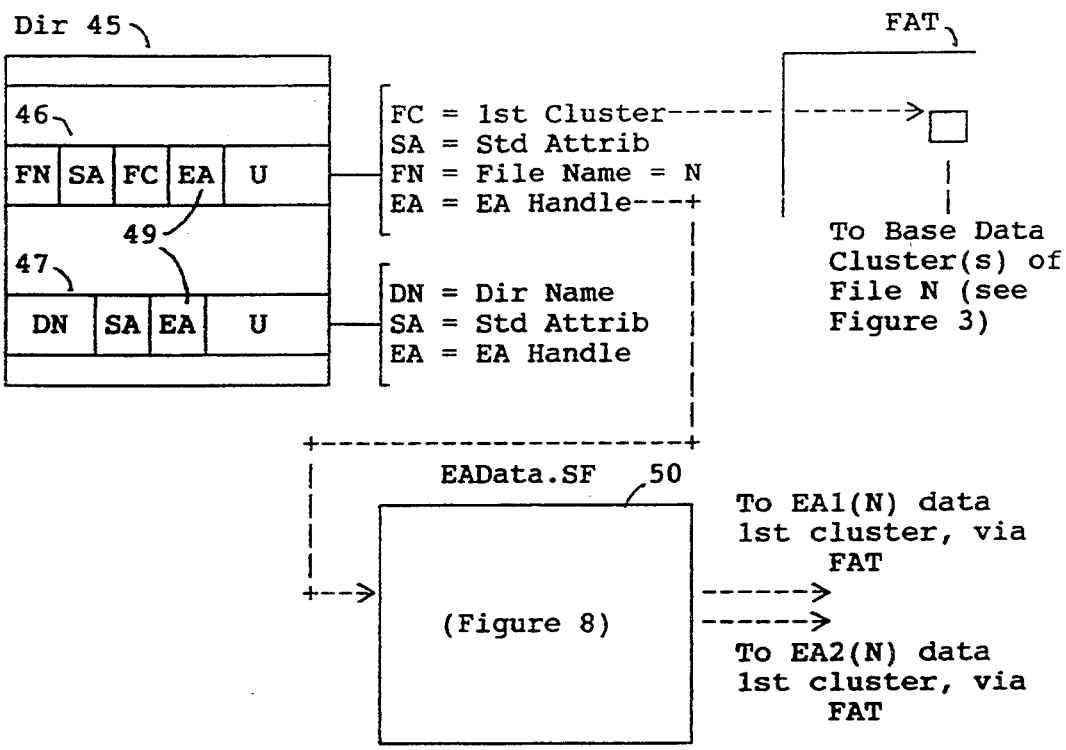
FIG. 7 illustrates a modified directory tree structure, in accordance with a preferred embodiment of the present invention, for locating EA data files.
Figure 8:
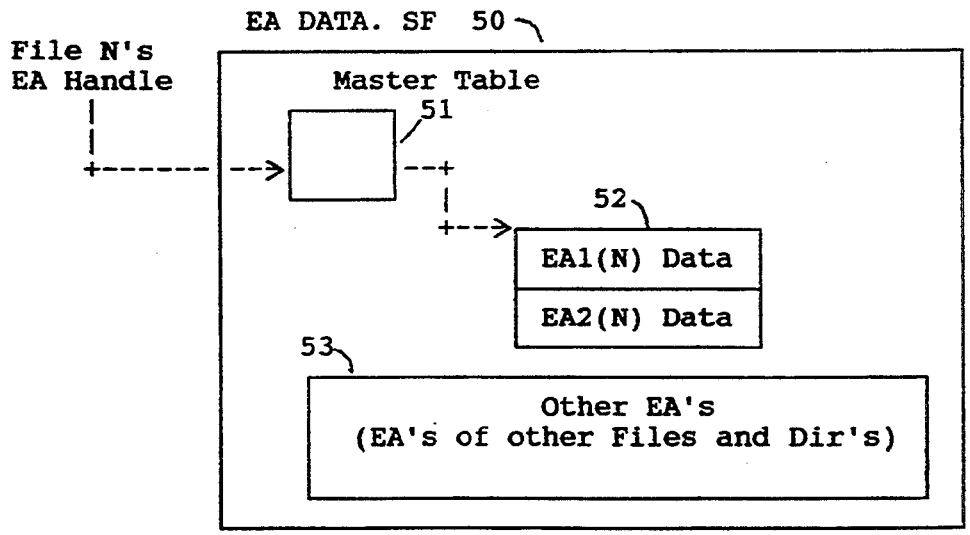
FIG. 8 illustrates how EA data files are stored in the preferred embodiment.

This implementation is based on assigning new use for previously unused/reserve parts of the directory tree list structures, and adapting the operating system and applications compatible therewith to use a number of newly defined function calls associated with the creation and conjoint management of EA files. Adaptation of the directory tree structure to accommodate conjoint handling of EA's is shown in FIGS. 7 and 8. Names and parameters of the new function calls just mentioned, shown in FIG. 9, and described below. These calls are also described in Chapter 2 of the foregoing Control Program Programming Reference and in chapter 33 of the above-referenced Programming Guide.

Referring to FIGS. 7 and 8, directory list 45 contains a file listing 46 for a file named N, which is to be associable with an EA, and a subdirectory listing 47 which also is to be associable with an EA (i.e. an EA associated with the subdirectory itself rather than a file listed in it). Functions indicated in these listings include a parameter designated EA, which, as shown to the right of block 45, represents an EA Handle value. The EA handle is used to locate the space allocated for storage of EA data associated with the file or subdirectory listing containing the handle. Note that the EA Handle parameter uses 2 of the previously unused bytes in the listing space (see FIG. 3). In the embodiment now being described, all EA data is stored in a single file space 50 allocated to a file named "EA DATA. SF". The construction of this space, and the manner in which it is allocated to EA data, are described next.

After formatting of a disk or partition, and at the first time that storage of EA data is required, the operating system creates the file EA DATA. SF. Sufficient chained clusters are allocated to this file to contain a master table 51 (FIG. 8) and the data of the first stored EA. When more clusters are required for storage of more EA data, additional clusters are chained to the file., so that the file always appears as a single threaded chain of clusters.

The master table is used to associate EA data with individual object (file or directory) names, and to locate a cluster, or the beginning of a chain of clusters, allocated to store that data. The first time EA data is stored in EA DATA. SF relative to any one named object, an entry is made in a first location in the master table designating the cluster or first cluster of a chain in which the EA data is stored, and an EA Handle such as 49 is placed in the directory listing of the named object so as to point to the space in the master list which contains the cluster or starting cluster for all of that object's EA data. This is repeated as initial EA data is stored relative to other object names, with corresponding entries placed in successive locations of the master table in the order in which the names are initially served, and with corresponding EA handles placed in associated directory listings of each object.

As each successive new name is initially served, a cluster or series of chained clusters is allocated to the associated EA data and incorporated within the space of EA DATA. SF by chained linkage to the last cluster allocated to the previously served name. Thus, EA DATA. SF is a progressively expanding series of chained clusters which grows as initial EA data is stored relative to a new file name. The chained linkage of the clusters contained in EA DATA. SF is accomplished via the FAT as explained earlier. That is, for initial allocation of a cluster or series of chained clusters to any object name, the FAT location corresponding to that cluster or the first in the series is marked as occupied. The FAT location mapped to the cluster last previously allocated is marked as chained to the cluster or first cluster newly allocated. If a series of chained clusters is so allocated, the FAT entry relative to each cluster in the series, other than the last, points to a next cluster in the series, and the last in the series is indicated to be the last.

If it becomes necessary to store additional EA data relative to an object whose existing EA data is chained within the EA DATA. SF space between clusters allocated to EA data of other objects, and if the additional EA data can not fit within the last cluster allocated to the respective object for EA storage, one or more additional clusters is allocated to that object and interpolated between the previous end cluster of its chain and the cluster to which that end cluster had been chained, so that all EA data associated with any one object is contiguously chained and thereby locatable by the single entry made in the master table for the respective object.

Thus, with reference to the example shown in FIGS. 7 and 8, if we assume that at some point in time, a first set of EA data is stored at 52 relative to file N (that set named EA1(N), and further that other EA data 53 is stored in EA DATA.SF before any more EA data is stored for file N, the cluster or last cluster containing EA1(N) data will be chained to a first cluster containing the other data 53. Furthermore, if another set of EA data is stored thereafter relative to N (the set shown as EA2(N) in FIG. 8), any part or all of the data of EA2(N) which can fit in any vacant portion of the cluster or last cluster allocated to EA1(N) will be stored in that cluster or last cluster. However, if the data of EA2(N) can not fit in that cluster or last cluster, one or more additional clusters will be allocated to the overflow data from EA2(N) and chained interpolatively between the last cluster previously allocated to N and the first cluster allocated to other EA's 53. Within the space allocated to any one file such as N, each set of EA(N) data consists of name and value portions, the name portion serving to identify the set and the value portion constituting the remaining data of the set. Lengths of these portions are known to and designated by the application creating the respective set, and stored with the respective data so that the end of one EA associated with N and the beginning of another EA associated with N is determinable by the operating system, whereby such sets can be accessed individually if necessary.

Figure 9:
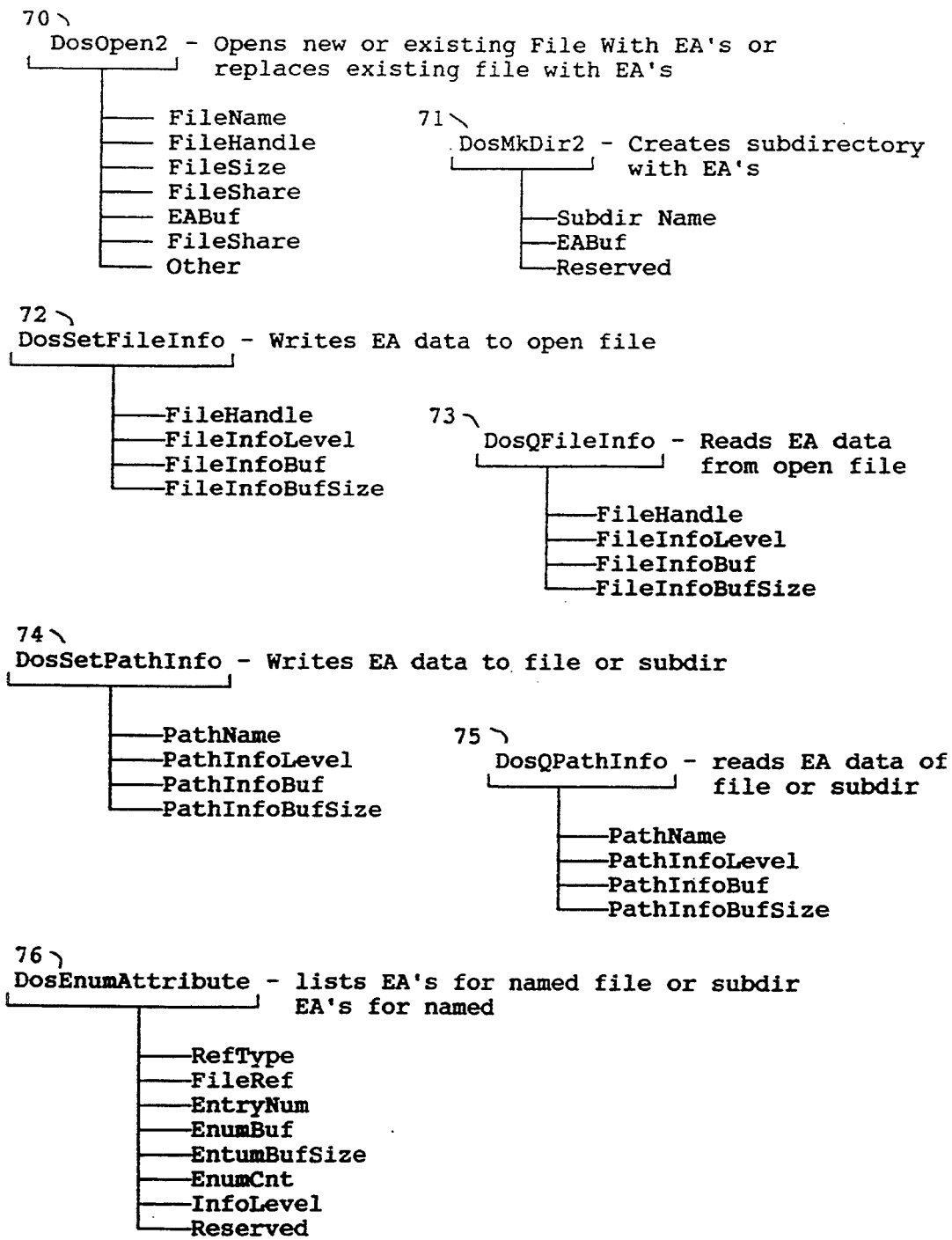
FIG. 9 illustrates function calls provided in OS/2 Version 1.2 for allowing applications running on that operating system to request operations provided for in that operating system for managing allocation and usage of disk storage space, relative to associated base data files and EA's, in accordance with the foregoing preferred embodiment of implementation of the present invention.

Referring to FIG. 9, OS/2-1.2 function calls of present interest and their principal functions are:

DosOpen2—creates a file with associated EA's

DosMkDir2—creates a subdirectory with associated EA's

DosSetFileInfo—sets attribute information for an open file

DosQFileInfo—reads attribute information in an open file

DosSetPathInfo—sets attribute information for a file. The file is not required to be open, but may be opened.

DosQPathInfo—reads attribute information for a file. The file is not required to be open, but may be open.

DosEnumAttribute—identifies EA's associated with a file or directory.

Principal parameters and usage of these calls are described next with reference to flow diagrams provided in FIGS. 10–15. Principal parameters are also shown in FIG. 9.

In addition to the above calls, pre-existing calls pertaining to the copying and erasure of files, and to removal of directories, are modified to enable the operating system to conditionally extend its handling of the file to embrace associated EA's. These pre-existing calls include: DosCopy, DosDelete and DosRmDir. DosCopy requires copying of the file, and its standard attributes, from a source path to a target path (path includes named device, directory, subdirectory and file entities). EA's are copied when a file is being created on the target entity, or when an existing file on the target entity is being replaced by the copied file. However, EA's are not copied when an existing file is being appended to another file.

DosDelete deletes the directory listing of a named file, and frees up FAT locations of clusters allocated to that listing for base file data and/or EA data, thereby effectively deleting any base file data and EA data associated with that file. When FAT locations associated with clusters containing EA data are freed up, the respective entry in master table 51 (FIG. 8) is deleted, and the FAT entries of clusters chained to the first and last clusters so freed are modified to chain together so that logical continuity of the space within EA DATA. SF is preserved. DosRmDir removes the directory listing of a named subdirectory, providing that subdirectory is empty, and frees up any FAT locations of clusters containing associated EA data, so that such data is effectively removed.

DosOpen2

This is a variant of the DosOpen call provided in earlier versions of OS/2 (refer to Page 2–201 of the Control Program Programming Reference). DosOpen is used to perform I/O operations relative to a file or a device (disk or partition). The operation opens the file or device, which according to the Glossary in the above-referenced Programming Guide means to establish a relationship indicating that the named file or device is being worked upon currently. DosOpen establishes such a relationship between a stored file and the associated application, and returns a handle to the application. The handle is a 16-bit identifier useful for quickly locating the file.

DosOpen2 call, shown at 70 in FIG. 9, extends the process of DosOpen to allow for storage of EA's relative to a named file. The file may be a newly created one, an existing one or a replacement for an existing one. The fields defined for this call (some not shown in FIG. 9) have the following names: FileName, FileHandle, ActionTaken, FileSize, FileAttribute, OpenFlag, OpenMode, EABuf and Unused/Reserved.

FileName is of course the name of the file to be stored in the respective directory listing. FileHandle is an address in memory at which a file handle for quickly locating the file is to be stored. OpenFlag denotes the action to be taken, as requested by the source of the call, and ActionTaken denotes the action actually taken. The action to be taken is generally one of: fail if file does not exist, fail if file exists, open if file exists, replace file if it exists. The action taken is generally one of: file exists, file created, file replaced. The action taken may differ from the requested action (e.g. if an existing file requested to be opened is already opened by another application with shared access denied).

FileSize denotes the size of the base file data and associated parameters other than EA's in bytes. This information is needed when creating or replacing a file to enable the operating system to allocate the correct number of clusters for storage of the base file data and associated parameters. FileAttribute consists of 16 bits, 11 of which are reserved. The remaining 5 denote: file archive (stored on archival basis), subdirectory, system file (associated with the operating system), hidden file, read only file. Attributes indicated by the unreserved bits are set into standard attribute bit fields in the associated directory listing. These bits may be set individually or in combination; e.g. they may be set to indicate a read only file which should be archived.

OpenMode consists of a number of flag fields including: a DASD Open flag bit, a Write Through flag bit, a Fail-Errors flag bit, a No Cache/Cache flag bit, a 3-bit Reference flag, a 3-bit Sharing Mode flag, and a 3-bit Access Mode flag. The value of the DASD Open bit distinguishes the named file as either an ordinary file or a device (mounted disk or diskette volume to be opened for direct access). The Write Through and No Cache/Cache flags indicate how file accesses are to be treated relative to cache (such treatment forming no part of the present invention). The Fail-Errors flag indicates the manner in which errors are to be reported (such reportage forming no part of the present invention). The Reference flag indicates how the file is to be accessed by the application: sequential access, random access, other (such mode of access forming no part of the present invention). The Sharing Mode flag defines restrictions placed on the file (by the calling process, or previously by another process, relative to processes other than the one defining the restriction) as one of: Deny Read/Write Access, Deny Write Access, Deny Read Access, or Deny None (allow all access). The Access Mode flag defines the access required by the caller (calling process) as one of: Read Only, Write Only, Read and Write.

EABuf provides the address in memory of a buffer space containing source EA data to be written to storage for the named file being created or replaced. It also includes information indicating lengths of name and value portions of such EA data. In this embodiment, EA data consists of a name portion representing the name of the EA data file and a value portion representing the EA data itself. Lengths of these portions are variable, and therefore must be explicitly designated in this manner in order to permit the operating system and other applications to locate these portions individually. If DosOpen2 is being used to open an existing file, EABuf has no meaning.

DosMkDir2

This call, shown at 71 in FIG. 9, is used generally to create a subdirectory with one or more associated EA's.

In addition to a reserved field, the call contains fields denoting specific functions and parameters consisting of: DirName (the name of the new subdirectory) and EABuf. EABuf provides the address in memory of an EA buffer space from which EA data is to be transferred, and the lengths of the name and value portion of any EA data entity to be transferred.

DosSetFileInfo and DosQFileInfo

These complementary call functions, shown respectively at 72 and 73 in FIG. 9, are used respectively for set (write) attribute data (standard or EA) to an open file (one opened by the caller), and query (read) such data from an open file. The parameters of both of these calls are: FileHandle, FileInfoLevel, FileInfoBuf, and FileInfoBufSize.

FileHandle is the FileHandle parameter returned to the caller in response to a prior DosOpen2 call.

FileInfoLevel is a level defined by the caller; level 1 or level 2, in the Set call, and level 1, level 2 or level 3 in the Query call. The defined level determines the type of information transferred between the storage file and the memory buffer space defined by EABuf, as described below.

FileInfoBuf provides the address in system memory of a data buffer which is the source of the attribute data for the Set function and the destination of such data for the Query function, and also in association with the level designated in FileInfoLevel determines what data is so transferred. FileInfoBufSize denotes the length of the data buffer in system memory defined by FileInfoBuf.

Data transferred when the level of the Set call is level 1 is standard attribute only, and includes: Date and time of file creation, date and time of last access to the file, and file size. Data transferred when the same call has a level 2 indication includes EA data. Such data can be either a single EA file defined by a name and length functions denoting the length of the name and value portions of that file, or it can be a series of EA data files defined by separate name and name length parameters given in the call.

Data transferred relative to a level 1 or level 2 Query call is respectively standard attribute data or standard attribute data along with information indicating the size of the associated EA data files (in aggregate). Level 3 Query call transfers EA data.

DosSetPathInfo and DosQPathInfo

These complementary set (write) and query (read) calls, shown respectively at 74 and 75 in FIG. 9, transfer attribute data (standard and EA) relative to existing files or subdirectories. A condition of successful execution for the set call is that the caller have exclusive access to the named object; so that if the named file or subdirectory is currently being accessed by another process the set call will fail. Both calls have parameters: PathName, PathInfoLevel, PathInfoBuf, and PathInfoBufSize. In addition, the Set function has a number of Flags described below.

PathName is the actual ASCII name of the file or subdirectory. This should be distinguished from the FileHandle used in DosSetFileInfo/DosQFileInfo, which is a quick access pointer to the location of the appropriate directory. In accessing a file or subdirectory with PathName information, the operating system must trace laboriously through the directory tree to locate the name, whereas in accessing the same by File Handle the operating system is led directly to a location in system memory where a copy of the required directory is stored.

PathInfoLevel is a level 1 or level 2 indication for the Set call, and a level 1, level 2 or level 3 indication for Query call. Level 1 directs transfer of standard attribute information. Set level 2 calls for transfer of EA data defined by PathInfoBuf and PathInfoBufSize. The flags associated with the Set call define how the call operation is to be performed, and distinguish whether the writing of the EA data to disk must or need not be completed before return indication is provided to the caller process. Query level 2 calls for transfer of standard attribute data and an indication of aggregate EA data file size for the associated file or subdirectory. Query level 3 calls for transfer of EA data per se.

DosEnumAttribute

This call, shown at 76 in FIG. 9, is used to have the operating system return to the caller a list of EA's associated with a named file or subdirectory.

Parameter names for this call are: RefType, FileRef, EntryNum, EnumBuf, EnumBufSize, EnumCnt and InfoLevel.

FileRef is either the address of a File Handle or the ASCII name of a file depending upon the value of the RefType bit.

EntryNum is a number indicating an entry point, relative to the chain of all associated EA's, at which to begin the return list of EA information.

EnumBuf, and EnumBufSize, respectively designate the starting address and size of a buffer space in system memory to which the return list is to be written.

EnumCnt is the address of a count value indicating the number of EA's for which information is requested. If the value is greater than 1 the enumerated information is returned in a packed list in which the entry for a next EA is stored adjacent to that for the preceding one.

InfoLevel is a level value, restricted to 1 in this embodiment, designating the level of information to be returned. The information returned at this level in essence consists of name and value portions of EA's and their lengths.

Call Operation Data Flow (FIGS. 10–15)

Referring to FIGS. 10–15, the sequences of operations performed by the operating system in response to the foregoing calls are described briefly. Reference numerals in the drawings are indicated below in parentheses after designations of respective operations. The operations for each function call begin when the operating system receives the respective call (i.e. when an interruption or equivalent process started by the calling process causes the operating system to fetch the respective call from storage).

Figure 10:
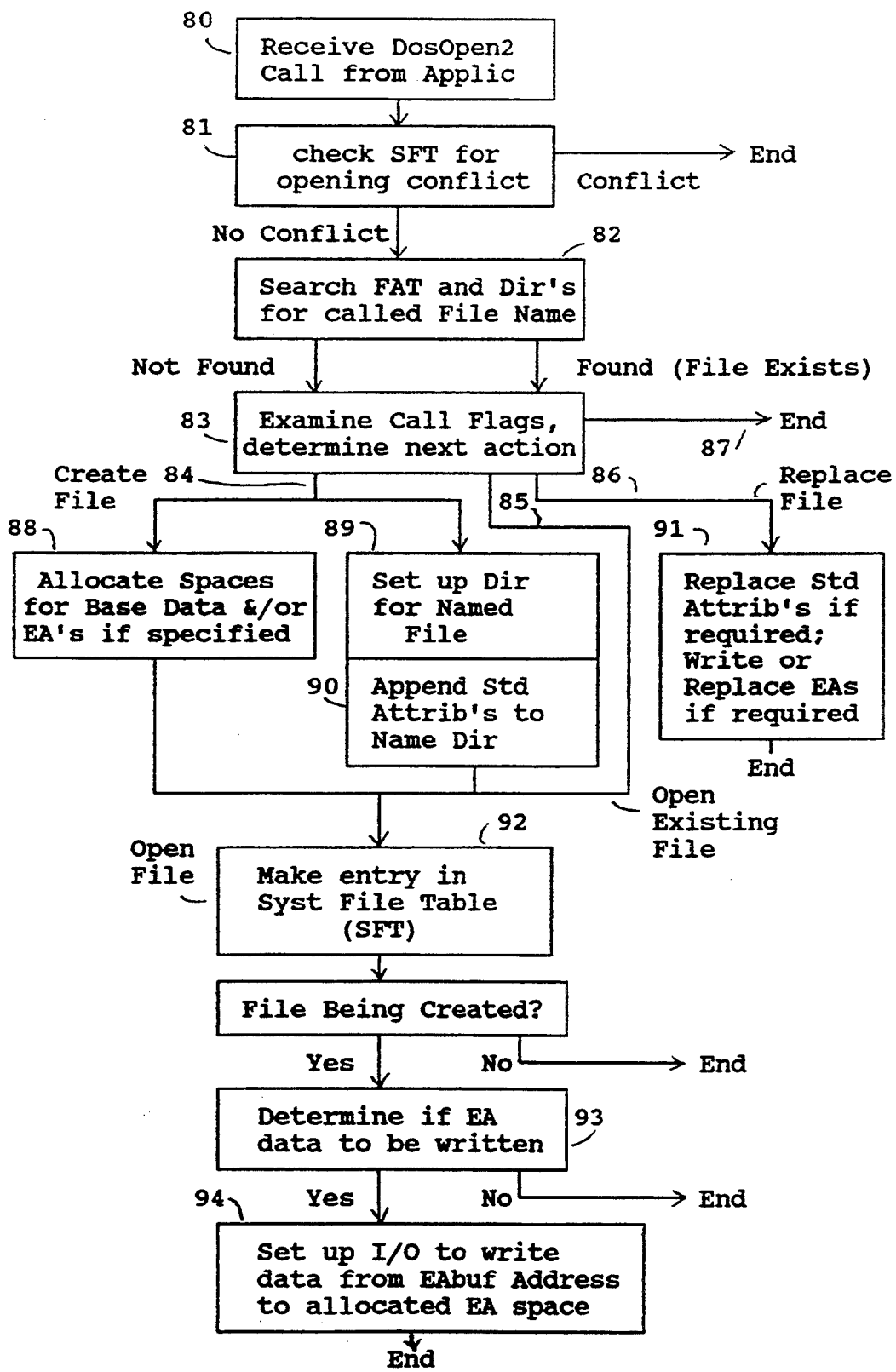
FIG. 10 is a flow diagram for explaining operations directed by OS/2 Version 1.2, in response to a DosOpen2 function call of the type shown in FIG. 9, for opening a new or existing (but unopened) file, optionally with one or more EA's, or replacing an existing file, optionally one having one or more EA's, in accordance with the foregoing preferred implementation embodiment.
Figure 11:
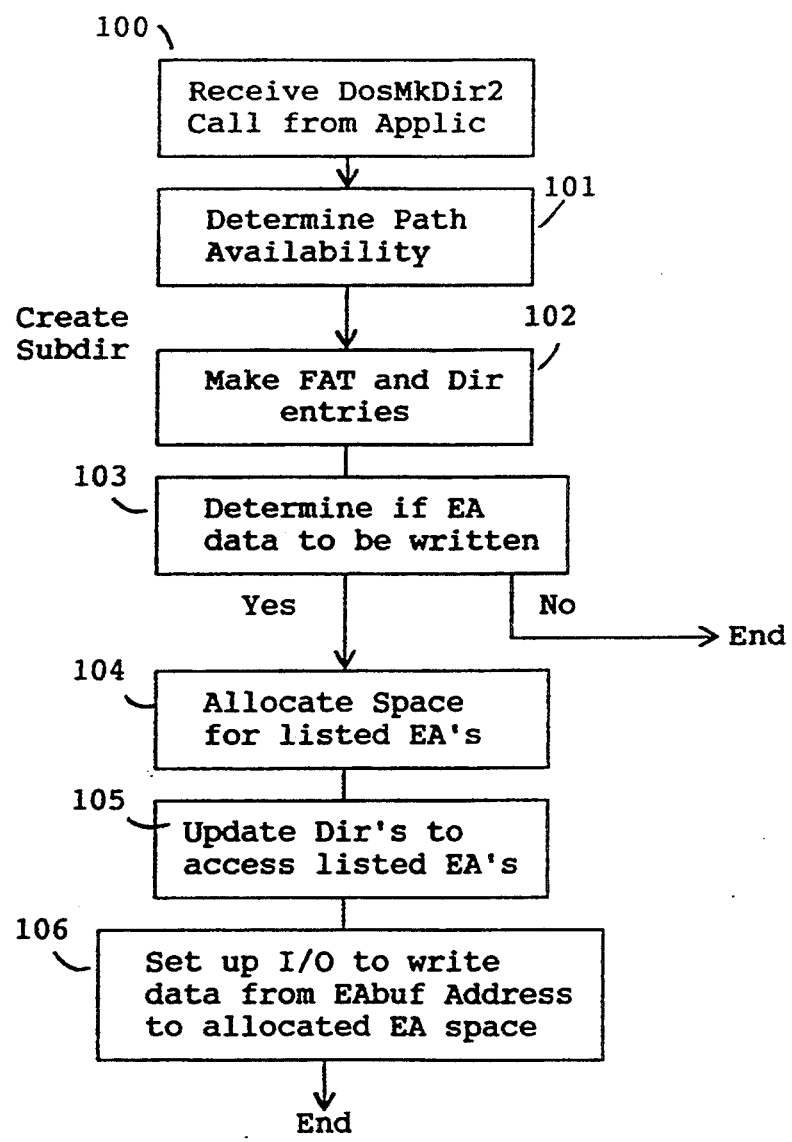
FIG. 11 is a flow diagram for explaining operations directed by OS/2 Version 1.2 for creating a new subdirectory with optional EA's, in response to function call DosMkDir2.

Upon receiving a DosOpen2 call (step 80, FIG. 10), operating system checks a system file (SFT) for opening conflicts relative to the named file or object (81, FIG. 10). If a conflict is detected the process ends in failure, but if conflict is not found (named file not open with conflicting sharing flags) the call process continues with action to locate the directory listing for the named object (82) if one exists. Depending upon the results of this action, the execution process exits to one of three action paths (84, 85 or 86).

If no directory listing is found, and if the flags allow for creation of a new file or object, exit 84 is taken to initiate file creation and opening actions described below. If the file exists, and flags permit its opening, exit 85 path is taken to initiate opening action. If the file exists, and flags call for replacement, exit path 86 is taken to initiate replacement of attribute and/or EA information (note that in all of the newly defined calls under consideration presently, the only actions taken relative to storing information in files involve writing of standard attribute information and/or EA data; to have base file data written to a file, the calling process must invoke one of the pre-existing DosWrite calls). If flags call for a fail or aborting action, exit 87 path is taken.

If the outcome of action 83 requires file creation (exit 84), operations 88–90 are performed to allocate file space as needed, make the required directory listing and write with standard attributes as required. If file replacement is required, action 91 is performed to replace attribute data (standard and/or EA) as required. If a file has been created (actions 88–90), or if an existing file is to be opened (exit 85 from action 83), action is taken (92) to enter information in the System File Table (SFT) mentioned in the earlier discussion of action 81. This entry includes the File Handle parameter which is thereby also returned to the caller process. If, at this point, EA data is yet to be written, action 94 is performed to do that and the call execution process ends. If writing of EA data is not required the process ends after action 93.

The operations sequence associated with DosMkDir2 (FIG. 11) begins with receipt of that call by the operating system (100), follows with determination of path availability (101) and creation of the subdirectory listing (102) if the path is available (if any part of the path, to the subdirectory named in the call as the one to be created, is non-existent the operation ends in a fail after action 101. If no EA data is to be written in association with the newly created subdirectory, the operation ends after action 103. Otherwise it continues with actions 104–106 to respectively allocate a cluster or clusters for the EA data, update the directory listing of the named subdirectory to include an EA Handle function pointing to the space within EA DATA. SF allocated to the associated EA data (FIGS. 7 and 8), and set up an output operation from the system to the storage subsystem to write the EA data into the allocated space.

Figure 12:
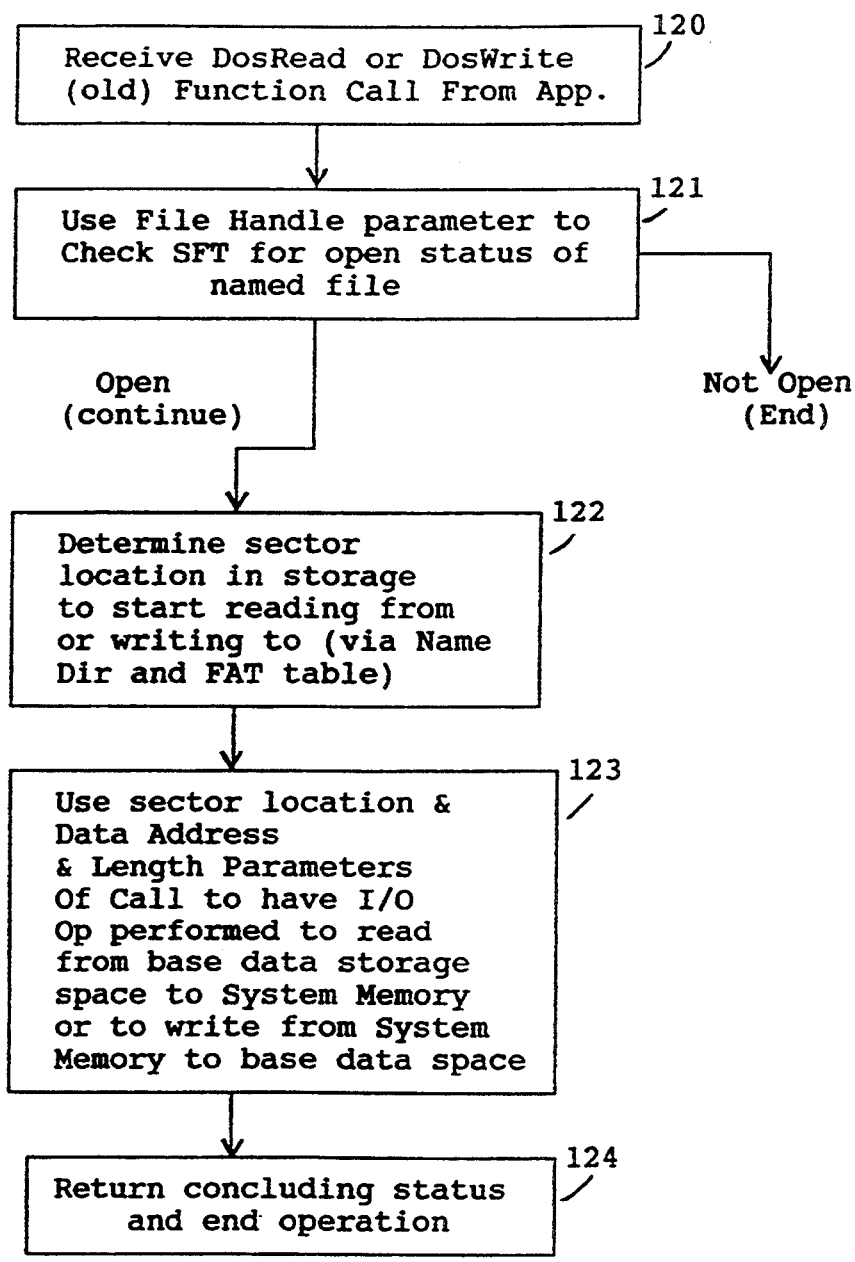
FIG. 12 is a flow diagram for explaining operations directed by OS/2 Version 1.2 for writing and reading base file data relative to files previously created in response to DosOpen2 function calls.

Actions for reading or writing base file data, relative to a file opened by DosOpen2, are suggested in FIG. 12. The process which opened the file, issues a conventional (old) DosRead or DosWrite call which the operating system receives at 120. This call contains a copy of the File Handle function returned to the caller on successful completion of the DosOpen2 operations. That function is used to check the SFT (121) for the current status of the named file (open to this caller or not open to this caller). If the file is not open the process ends at 121. If the file is open to this caller, action 122 is performed to locate a cluster in storage to start reading data from or writing data to (if writing data, and space is not currently allocated, the required cluster or chain of clusters is/are allocated via the FAT before data is written). Next, an input or output system operation is invoked to carry out the required reading or writing of base file data (123), after which concluding status is returned to the caller and the operation ends (124).

Figure 13:
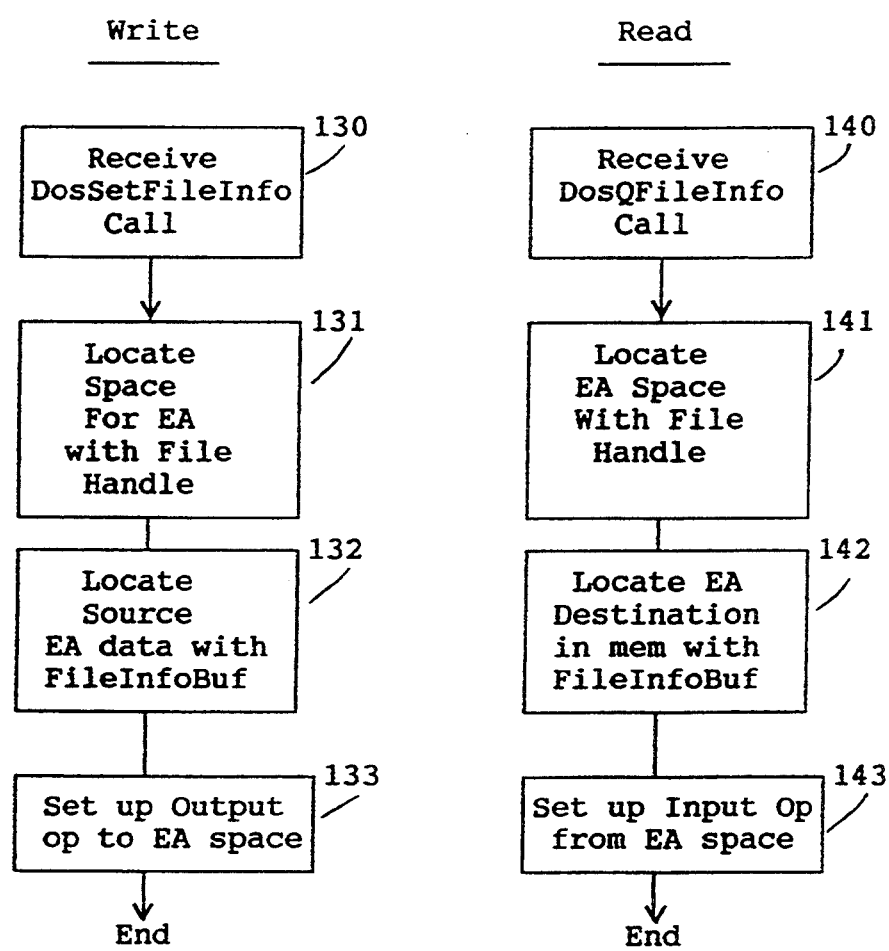
FIG. 13 is a flow diagram for explaining operations directed by OS/2 Version 1.2 for writing and reading attribute data relative to open files in response to calls DosSetFileInfo and DosQFileInfo shown in FIG. 9.

Operations to read or write attribute information (standard or EA) relative to an open file are shown in FIG. 13. Writing operations begin with receipt of call DosSetFileInfo (130), and follow with use of the File Handle given in that call to locate the directory listing for the named object (131). Using the FileInfoBuf information in the call, the system memory space containing attribute data to be written is determined (132). If EA data is to be written to as yet unallocated clusters, such clusters are allocated by processes previously described (this step not shown in FIG. 13), and the required output operation from system memory to the storage subsystem is then invoked (133).

The complementary operation of reading attribute data begins with receipt of the DosQFileInfo call (140), continues with location of the directory listing via File Handle information in the call (141), followed by location of the source EA data to be read and its destination in system memory as designated in the FileInfoBuf parameter of the call (142), followed by initiation of an input operation from storage subsystem to system memory for executing the required transfer (143).

Figure 14:
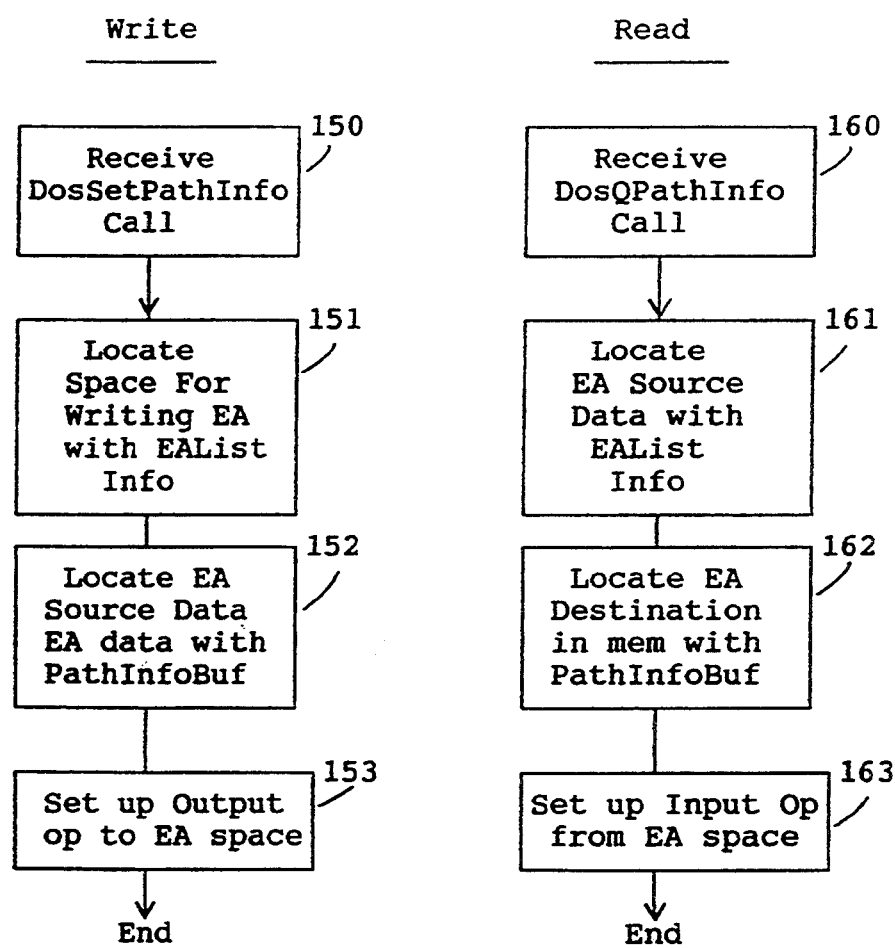
FIG. 14 is a flow diagram for explaining operations performed in the foregoing implementation embodiment, for writing and reading attribute data relative to existing files.

Operations to write and read attribute information relative to a closed file are shown in FIG. 14. The write operations, called by DosSetPathInfo (150), require location of the directory listing of the named file object (via searching of the directory tree, since a File Handle is not given) and if EA data is to be written determination (152) of the destination clusters to receive that data (if such clusters have not been allocated, they are allocated in this step and appropriately indexed in the directory listing as described previously). The source standard attribute and/or EA data is located via the PathInfoBuf and PathInfoBufSize information in the call (152), and the required output operation from system memory to storage subsystem is invoked (153).

The read operations, called by DosQPathInfo (160), initiate operations to locate the directory listing and/or clusters containing the source data to be read (161) and to locate the destination in system memory of such data (162), the latter determined from the contents of PathInfoBuf. Finally, the input operation from the storage subsystem to system memory, for transferring the source attribute information to the destination location, is set up (163).

Figure 15:
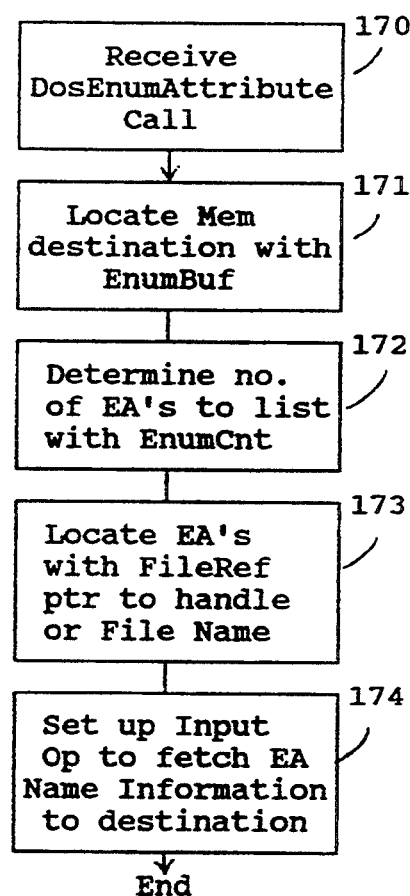
FIG. 15 is a flow diagram for explaining operations performed in OS/2 Version 1.2 in response to DosEnumAttribute function calls requesting enumeration of EA's associated with a designated file or subdirectory name.

Operations to list EA name information associated with a file object are shown in FIG. 15, starting with receipt by the operating system of a DosEnumAttribute call (170). The destination of the list report in system memory is determined via the information in EnumBuf (171), followed by determination of the number of EA's to list (172) and the location of the information to be listed (173). Last, an input operation from storage subsystem source to system memory destination is set up (174) completing the process.

We claim:

1. For a computer system containing an operating system and a memory subsystem, and having one or more direct access storage devices attached thereto, an arrangement for adapting said operating system to store, modify and read extended attribute (EA) data associated with named objects contained in said storage devices; said arrangement comprising:

one or more path tables under exclusive control of said operating system tables being stored in said storage devices, and in said memory subsystem when said computer system is communicating with the respective storage device; each said path table containing locations therein reserved for storing names of objects associated with the respective storage device and EA handle information for locating EA data stored in association with respective said objects;

first means under exclusive control of said operating system, said first means being responsive to first function calls, each designating a storage device and an EA handle, for causing EA data to be transferred to or from storage locations in respectively designated storage devices; each said storage location being found only by means of the EA handle designated in the respective first function call, and second means under exclusive control of said operating system, said second means being responsive to second function calls, each designating a device and an object name, for causing EA data associated with respectively designated object names to be transferred to or from storage locations in designated devices; wherein each said storage location is determined by referring to a said path table containing the respective object name and using an associated EA handle stored in said path table for locating a storage position in the respectively designated device relative to which said EA data is to be transferred wherein said named objects include directory and subdirectory paths in said devices, and said file data stored in said paths, and wherein each said path table is associated with a single path in a single device and contains spaces for storing entries representing the respective path and any data files stored in that path; each said entry space containing a position therein reserved for optionally storing said EA handle when EA data is stored in the respective device in association with the respective object name represented by the entry.

2. The arrangement of claim 1 wherein said second means comprises:

means responsive to object names assigned to sets of file data, which object names are designated in said second function calls, for jointly handling transfers of file data sets and EA data relative to devices designated in respective second calls.

3. The arrangement of claim 1 wherein EA data associated with a single said device and a single said object name includes plural sets of EA data stored at a plurality of discretely separate locations in the associated device.

4. The arrangement of claim 3 including:

a master table of EA pointers associated with each said storage device, each EA pointer in each said master table pointing to the storage location in the respective device of a single set of EA data; wherein:

each said EA handle points to a single EA pointer in one of said master tables, and is thereby useful by said second means for locating a storage position in the respective device allocated for handling of a single respective set of EA data.

5. A method of adapting a computer operating system to manage storage, modification and retrieval of extended attribute (EA) data associated with named objects, wherein said operating system is exclusively responsible for directing storage of and access to information associated with said EA data and named objects in direct access storage devices: said method comprising:

in response to requests from programs using said operating system, storing EA data in said direct access storage devices and storing EA handle functions in the same devices in path tables accessible exclusively to said operating system; said EA handle functions being useful by said operating system for locating storage positions of respective said EA data; each said EA handle function stored in a said path table being stored in association with an object name;

in response to first function calls from said programs using said operating system, each first function call designating a device and an object name, directing access to a respectively designated device for reading, writing or modifying EA data; said access being implemented by using a respectively designated object name to locate a path table containing an EA handle associated with the designated name, and by using said EA handle in said located path table to determine a storage location in said device at which to read, write or modify EA data associated with the respectively designated object name; and in response to second function calls from said programs using said operating system, each said second function call designating a storage device and an EA handle, directing access to a said designated storage device for reading, writing or modifying EA data at a location in the respectively designated device determined only by means of said respectively designated EA handle; i.e. without reference to any said associated object name or path table wherein some of said object names represent directory and subdirectory paths on respective said devices and other said object names represent file data stored in said paths; and each of said path tables contains an entry including a name of a said directory or subdirectory path, and zero, one, or more other entries containing names representing zero, one, or more associated sets of file data stored in the path defined by the respective directory or subdirectory name entry.

6. The method of claim 5 including:

in conjunction with said step of reading or modifying EA data, and in response to some of said program requests, selectively reading or modifying file data associated with object names designated in said some requests.

7. The method of claim 5 wherein said step of storing said EA data and EA handles includes:

storing a plurality of discrete sets of EA data associated with a single object name, at various different locations in a said storage device;

storing a single EA handle associated with said single object name in a path table entry assigned to said object name; and establishing a predetermined link between said single EA handle and all of EA data sets allowing for location of any of said data sets by means of said single EA handle.

8. The method of claim 7 wherein said step of establishing said predetermined link comprises:

relative to each storage device containing stored EA data, maintaining a master table of pointers to said EA data, said list structured so that it begins at a predetermined location associatable with all EA handles, and contains linked pointer entries designating storage locations of individual said EA data sets associated with any of said object names.

9. For a computer system containing an operating system and a memory subsystem, and having one or more direct access storage devices attached thereto, an arrangement for adapting said operating system to exclusively direct access to said direct access storage devices for managing information objects in association with specific object names and for managing storage of and access to extended attribute (EA) data in association with said specific object names; said information objects including directory and subdirectory paths in said direct access storage devices, and data files stored in said paths; said arrangement comprising:

one or more path tables Under exclusive control of said operating system, said path tables being stored in said direct access storage devices, wherein each said path table is associated with a single path in a single device and in said memory subsystem when said computer system is communicating with the respective storage device; each said path table operating system, and each said table containing locations therein reserved for storing names of information objects associated with the respective device and EA handle information useful as pointers for locating EA data associated with respective said names;

first means under exclusive control of said operating system, said first means being responsive to first function calls, each designating a storage device and an EA handle, for causing EA data to be transferred to or from storage locations in respectively designated storage devices; wherein said first means operates to find said storage locations for said EA data transfers only by means of the EA handles designated in the respective first function calls; i.e. without reference to any said path tables; and second means responsive to second function calls, each designating a device and an object name, for linking the designated object names to EA handles via said path tables, and, using said linked EA handles as pointers, causing EA data to be transferred to or from designated devices at locations indirectly indicating said linked EA handles; said second means including:

means responsive to object names assigned to said data files, which object names are designated in said second function calls, for jointly handling transfers of associated data files and EA data relative to devices designated in respective said second function calls.

10. The arrangement of claim 9 wherein EA data associated with a single said device and a single said object name includes plural sets of EA data stored at a plurality of discretely separate locations in the associated device; and said arrangement includes:

a master table of EA pointers associated with each said storage device, and stored in said memory subsystem when the system is communicating with the respective storage device; each EA pointer in each said master table pointing to a storage location in the respective device at which a single said set of EA data is stored; said arrangement being characterized in that:

each said EA handle points to a single EA pointer in a single said master table, and each EA pointer in each master table is thereby useful by said second means for locating a storage position in the respective device at which a single associated set of EA data is stored.

* * * * *